United States Patent
Pietarinen et al.

(10) Patent No.: US 9,501,958 B2
(45) Date of Patent: Nov. 22, 2016

(54) SEALING LABEL

(71) Applicant: UPM Raflatac Oy, Tampere (FI)

(72) Inventors: Markku Pietarinen, Tampere (FI); Jari Herranen, Tampere (FI)

(73) Assignee: UPM RAFLATAC OY, Tampere (FI)

( * ) Notice: Subject to any disclaimer, the term of this patent is extended or adjusted under 35 U.S.C. 154(b) by 0 days.

(21) Appl. No.: 14/580,276

(22) Filed: Dec. 23, 2014

(65) Prior Publication Data

US 2016/0180747 A1  Jun. 23, 2016

(51) Int. Cl.
| | | |
|---|---|---|
| *G09F 3/00* | (2006.01) | |
| *C09J 7/02* | (2006.01) | |
| *B65D 55/02* | (2006.01) | |
| *G09F 3/02* | (2006.01) | |
| *G09F 3/03* | (2006.01) | |
| *G09F 3/10* | (2006.01) | |

(52) U.S. Cl.
CPC .......... *G09F 3/0292* (2013.01); *B65D 55/026* (2013.01); *C09J 7/0275* (2013.01); *G09F 3/02* (2013.01); *G09F 3/0341* (2013.01); *C09J 2203/334* (2013.01); *C09J 2423/106* (2013.01); *G09F 3/10* (2013.01); *G09F 2003/0226* (2013.01); *G09F 2003/0245* (2013.01); *G09F 2003/0272* (2013.01); *G09F 2003/0276* (2013.01); *G09F 2003/0277* (2013.01)

(58) Field of Classification Search
CPC ...... B65D 55/026; C09J 7/0275; G09F 3/02; G09F 3/0292
USPC .......................................................... 40/312
See application file for complete search history.

(56) References Cited

U.S. PATENT DOCUMENTS

| | | | | |
|---|---|---|---|---|
| 5,135,262 A | * | 8/1992 | Smith .................. | B65D 55/026 205/152 |
| 5,149,386 A | * | 9/1992 | Smits .................... | B65D 55/026 156/150 |

(Continued)

FOREIGN PATENT DOCUMENTS

| | | |
|---|---|---|
| JP | 2006039312 | 9/2006 |
| JP | 2012014016 | 1/2012 |

*Primary Examiner* — Shin Kim
(74) *Attorney, Agent, or Firm* — Cantor Colburn LLP

(57) ABSTRACT

A sealing label suitable for sealing a package made of varnished cardboard comprises:
  a carrier layer, and
  an adhesive layer,
wherein the thickness of the carrier layer, the material of the carrier layer, and the composition of the adhesive layer have been selected such that:
  a minimum deformation force of the label is smaller than a first breaking force needed to break the cardboard material of the varnished cardboard,
  a minimum detaching force of the label is greater than the first breaking force, and
  the minimum detaching force is smaller than a second breaking force needed to break the label,
wherein the first breaking force is a first pulling force which causes breaking of the cardboard material in a situation where the label is separated from the varnished cardboard by pulling the label with said first pulling force, and the minimum detaching force is a second pulling force which is needed to separate the adhesive layer of the label from the surface of the varnished cardboard in a situation where the label is pulled with said second pulling force.

17 Claims, 9 Drawing Sheets

(56) References Cited

U.S. PATENT DOCUMENTS

| | | | |
|---|---|---|---|
| 5,629,093 A | 5/1997 | Bischof et al. | |
| 5,660,925 A * | 8/1997 | Cooley | G09F 3/0292 428/195.1 |
| 6,090,027 A * | 7/2000 | Brinkman | B65B 5/02 156/DIG. 4 |
| 6,196,383 B1 * | 3/2001 | Pinchen | B65D 55/026 206/264 |
| 6,413,605 B1 * | 7/2002 | Hoffer | B65D 55/026 283/101 |
| 2005/0197272 A1 * | 9/2005 | Bethune | B65D 5/62 510/406 |
| 2005/0230961 A1 * | 10/2005 | Walley | G09F 3/0292 283/81 |
| 2007/0130811 A1 * | 6/2007 | Shevelev | B65D 55/0818 40/312 |

* cited by examiner

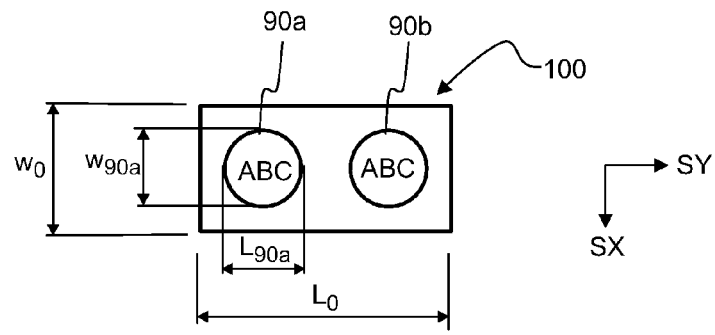
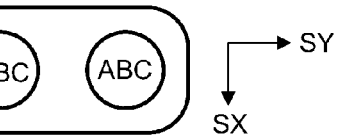
Fig. 2c
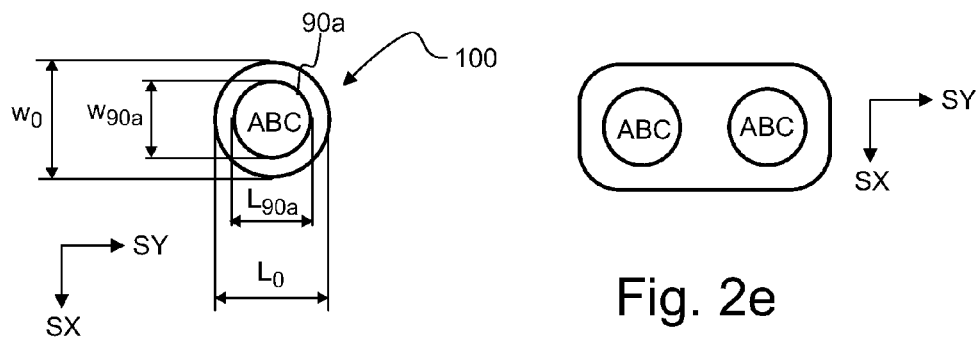
Fig. 2d
Fig. 2e
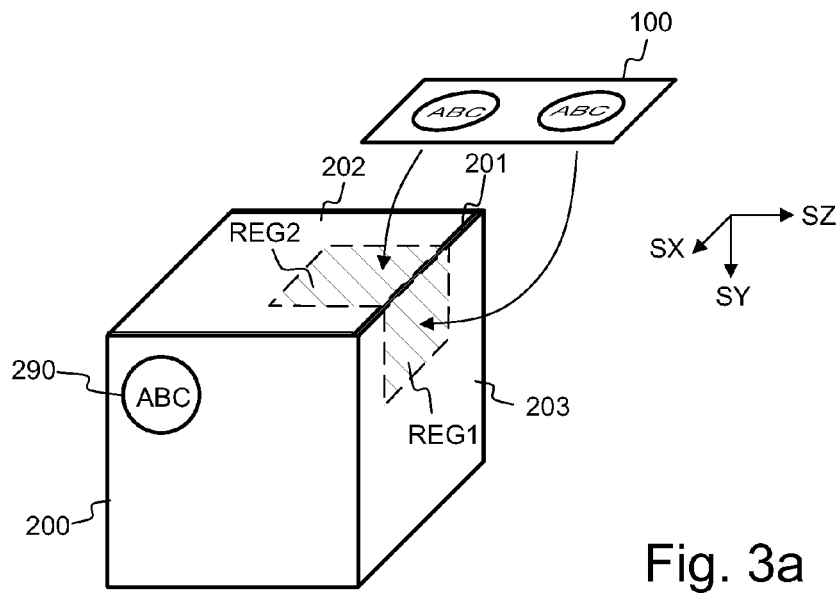
Fig. 3a

SEALING LABEL

FIELD

Some variations relate to tamper-evident sealing of a package.

BACKGROUND

Referring to FIG. 1, an opening joint 201 of a package 200 may be sealed with a label LABEL0. The label may comprise one or more visual markings MRK1. The marking MRK1 may be e.g. a hologram, which represents a trade mark associated with a product.

The label may be attached to the package such that package cannot be opened without damaging the package or without damaging the label. The presence of an intact sealing label on the package may be interpreted to indicate that the package has not been tampered. The presence of an intact sealing label on the package may be interpreted to indicate e.g. that the original contents of the package has not been replaced with a falsified product.

However, the label can sometimes be detached from the package such that the label remains intact or such that the package remains intact. A detached intact label may be re-used for unauthorized purposes. For example, a potential counterfeiter could obtain an intact label by separating it from a first package (by damaging the first package), and the potential counterfeiter could also obtain an intact second package by removing a second label from the second package (by damaging the second label). The potential counterfeiter could subsequently replace the contents of the intact second package, and re-seal the second package with the intact label without leaving visual indications that the second package has been tampered. In other words, a detached label could be attached to a re-used package such that the resulting combination does not have visually detectable damage.

It is known to use a sealing label, which comprises one or more incisions or perforations. The incisions or perforations may weaken the structure of the label such that separating the label from a surface is likely to cause tearing of the label. However, before the labels are attached to the item to be labelled, the adhesive may leak through the incisions or perforations so that the leaking adhesive causes problems in the label rolls or during handling or dispensing of the individual labels. After the labels have been dispensed, i.e. attached to the items to be labeled, the incisions or perforations may form protrusions, which may inadvertently stick to foreign objects or collide with the foreign objects. Consequently, handling of such labels or items labelled with such labels may cause problems.

SUMMARY

Some variations may relate to a sealing label. Some variations may relate to a combination of a package and a sealing label. Some variations may relate to a method for producing a sealing label. Some variations may relate to a method for producing a sealing label web. Some variations may relate to a method of attaching a sealing label to a package. Some variations may relate to a method of removing a sealing label from a package. Some variations may relate to a method of checking whether a package has been tampered. Some variations may relate to a label web. Some variations may relate to producing a label web.

According to an aspect, there is provided a label suitable for use on a varnished cardboard, the label comprising:
   a carrier layer, and
   an adhesive layer,
wherein the thickness of the carrier layer, the material of the carrier layer, and the composition of the adhesive layer have been selected such that:
   a minimum deformation force of the label is smaller than a first breaking force needed to break the cardboard material of the varnished cardboard,
   a minimum detaching force of the label is greater than the first breaking force, and
   the minimum detaching force is smaller than a second breaking force needed to break the label,
wherein the first breaking force is a first pulling force which causes breaking of the cardboard material in a situation where the label is separated from the varnished cardboard by pulling the label with said first pulling force, and the minimum detaching force is a second pulling force which is needed to separate the label from the outer surface of the varnished cardboard in a situation where the label is pulled with said second pulling force.

According to an aspect, there is provided a combination of a label and a package, wherein the package comprises varnished cardboard, the label has been attached to the package such that an opening joint is located between two attachment regions of the label, the label comprising:
   a carrier layer, and
   an adhesive layer,
wherein the thickness of the carrier layer, the material of the carrier layer, and the composition of the adhesive layer have been selected such that:
   a minimum deformation force of the label is smaller than a first breaking force needed to break the cardboard material of the varnished cardboard,
   a minimum detaching force of the label is greater than the first breaking force, and
   the minimum detaching force is smaller than a second breaking force needed to break the label,
wherein the first breaking force is a first pulling force which causes breaking of the cardboard material in a situation where the label is separated from the varnished cardboard by pulling the label with said first pulling force, and the minimum detaching force is a second pulling force which is needed to separate the label from the outer surface of the varnished cardboard in a situation where the label is pulled with said second pulling force.

According to an aspect, there is provided a web, comprising:
   a carrier layer, and
   an adhesive layer,
wherein the thickness of the carrier layer, the material of the carrier layer, and the composition of the adhesive layer have been selected such that:
   a minimum deformation stress value of the carrier layer is smaller than a minimum breaking stress value of the carrier layer,
   a minimum detaching stress value of the carrier layer is greater than the minimum breaking stress value of the carrier layer, and
   the minimum detaching stress value of the carrier layer is smaller than the tensile strength of the carrier layer,
wherein the minimum deformation stress value is the stress of the carrier layer in a situation where a label cut from the web is pulled by a pulling force, which causes 30% final elongation of the carrier layer; the minimum breaking stress value is the stress of the carrier layer in a situation where a label cut from the web is separated from varnished cardboard by a pulling force, which causes breaking of the cardboard material; and the minimum detaching stress value is the stress of the carrier layer in a situation where a label cut from the web is separated from the surface of a varnished cardboard by a pulling force.

The label may be attached to a package, which comprises varnished cardboard. The label may be used as a tamper-evident seal. The properties of the tamper-evident label may be selected such that it is difficult or impossible to separate the label from the varnished cardboard without damaging both the label and the cardboard. Separating the label from the package may cause detectable damage both to the label and to the package. Separating the label from the package may, at a very high probability, cause visually detectable damage both to the label and to the package. This may make unauthorized re-use of the label and the cardboard package more difficult. An unaltered label on the surface of the package may be interpreted to be an indication that the package has not been tampered.

The properties of the tamper-evident label may be selected such that separating the label away from varnished cardboard causes detectable irreversible stretching of the label itself and detectable tearing of the cardboard material. Said stretching and tearing may be visually detectable. Separating the label from the varnished cardboard may inevitably cause visual indications to the label and to the package, which may make unauthorized re-use of the label and the package more difficult. In an embodiment, separating the label from a package may damage the surface of the package. In an embodiment, separating the label from a package may cause so severe damage to the package that the package cannot be used again.

In an embodiment, the varnished cardboard may be used as a part of the tamper evident system such that the label does not comprise an incision and/or a perforated part. Consequently, the label may have a substantially smooth upper surface. The smooth upper surface does not have a tendency to inadvertently stick to foreign objects. The carrier layer of the label may be substantially continuous. The substantially continuous carrier layer of the label may substantially prevent leaking of adhesive to the upper side of the label. The smooth upper surface of the label may facilitate transporting and handling of a package equipped with the sealing label. The smooth upper surface of the label may reduce the risk of prematurely damaging the label. The varnished cardboard may be used as a part of the tamper evident system such that the package does not comprise an incision.

BRIEF DESCRIPTION OF THE DRAWINGS

In the following examples, several variations will be described in more detail with reference to the appended drawings, in which FIG. 2c shows, by way of example, in a top view, dimensions of a sealing label, FIG. 2d shows, by way of example, in a top view, a substantially circular sealing label, FIG. 2e show, by way of example, in a top view, a sealing label which has rounded corners, FIG. 3a shows, by way of example, in a three dimensional view, attaching the sealing label to a package.

DETAILED DESCRIPTION

Figure 1:
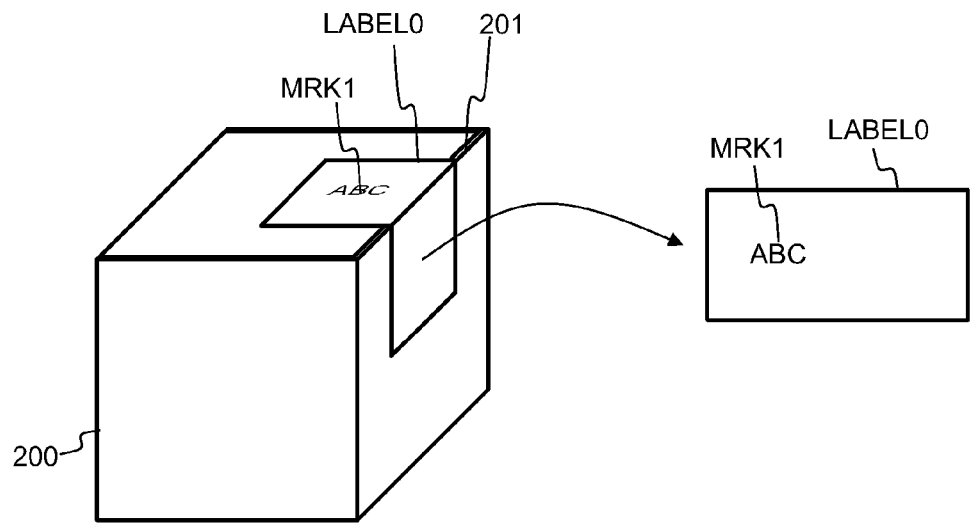
FIG. 1 shows, by way of example, in a three dimensional view, a combination of a package and a label.
Figure 2A:
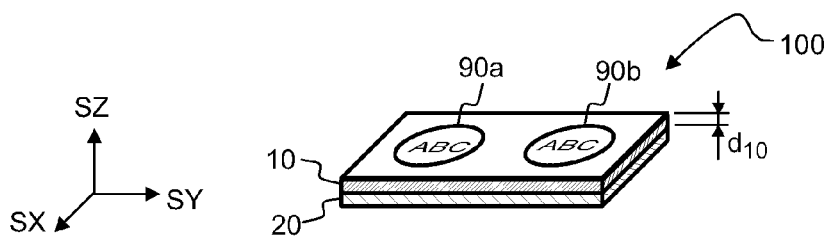
FIG. 2a shows, by way of example, in a three dimensional view, a sealing label.

Referring to FIG. 2a, the sealing label 100 may comprise a carrier layer 10 and an adhesive layer 20. The carrier layer 10 may also be called e.g. as the feedstock material. The adhesive layer 20 may comprise an adhesive composition.

The carrier layer 10 may have an initial thickness $d_{10}$. The initial thickness $d_{10}$ of the carrier layer 10 may be e.g. in the range of 10 μm to 100 μm.

The label 100 may comprise one or more markings 90a, 90b. One or more markings 90a, 90b of the label 100 may be arranged to operate as visual stretching indicators. The marking 90a, 90b may be e.g. a hologram, text or any type of image or combination of those, which represents information or a trade mark associated with a product.

In an embodiment, the label 100 may have e.g. a substantially circular shape or a substantially square shape. Consequently, the original perimeter of the label 100 may be used as a visual stretching indicator.

In an embodiment, the label 100 may also be implemented such that it does not comprise any markings 90a, 90b. The original perimeter of the label 100 may be used as the visual stretching indicator.

Figure 7A:
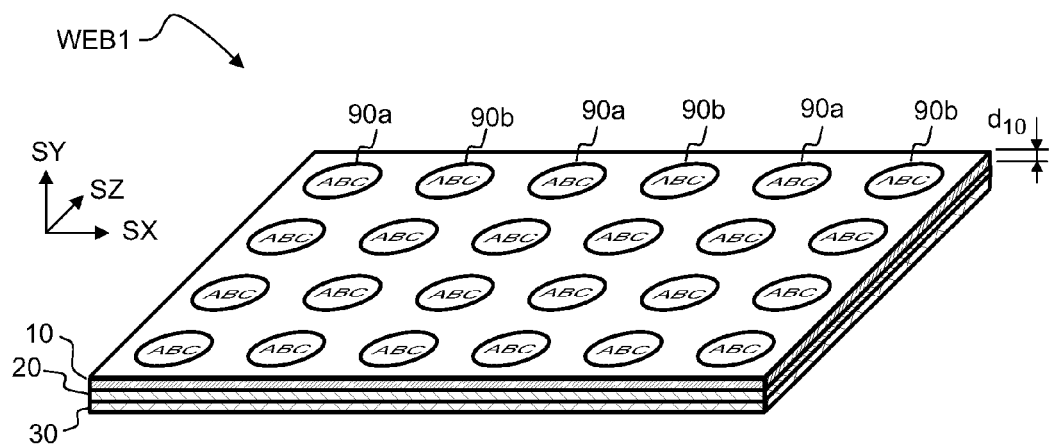
FIG. 7a shows, by way of example, in a three dimensional view, a label web for forming a plurality of labels.
Figure 7B:
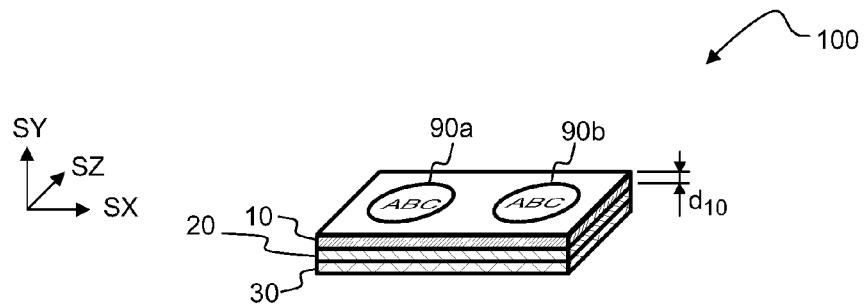
FIG. 7b shows, by way of example, a sealing label having a release liner.

The label 100 may be optionally attached to a release layer 30 (See FIGS. 7a and 7b). The release layer 30 may protect the adhesive layer 20 during storage and/or transportation. The release layer 30 may also protect the label 100 against premature deformation during storage and/or transportation. The release layer 30 may be separated from the label 100 prior to attaching the label 100 to a package 200.

The materials of the carrier layer 10 and the adhesive layer 20 may be selected such that the label 100 is substantially transparent. In an embodiment, the dimensions of the transparent label 100 do not need to be matched with the dimensions of the package 200. Consequently, substantially identical labels 100 may be used as tamper-evident seals for packages of various different sizes.

The materials of the carrier layer 10 and the adhesive layer 20 may be selected such that the label 100 has a white color. The materials of the carrier layer 10 and the adhesive layer 20 may be selected such that the label 100 has a selected color, e.g. white, red, green, blue or black. The markings 90a, 90b may be visually detectable. The markings 90a, 90b may comprise one or more visually detectable colors The materials and the thickness of the label 100 may be selected such that the label 100 may be easily bent. Consequently, the label may easily conform to the three-dimensional shape of the package 200. The label 100 may be easily bent to cover e.g. an angled portion of the package 200.

The carrier layer 10 may be easily stretched when pulled by a pulling force. The carrier layer 10 may be irreversibly stretched when pulled by the pulling force. The elongation $E_{BRK}$ of the layer 10 at break may be e.g. in the range of 350% to 800%.

The carrier layer 10 may comprise e.g. polypropylene film (PP). In particular, the polypropylene film may be suitable for pharmaceutical use. The thickness $d_{10}$ of the film may be e.g. in the range of 20 μm to 200 μm, in the range of 30 μm to 100 μm, or in the range of 40 μm to 80 μm. The tensile strength $\sigma_{BRK}$ of the carrier layer 10 may be e.g. in the range of 20 N/mm² to 50 N/mm². The elongation $E_{BRK}$ of the layer 10 at break may be e.g. in the range of 350% to 800%, in the range of 400% to 700%, or in the range of 500% to 650%. The elongation $E_{BRK}$ of the layer 10 at break may be e.g. greater than 350%. The elongation $E_{BRK}$ of the layer 10 at break may be e.g. greater than 500%.

In particular, the thickness $d_{10}$ of a polypropylene film 10 may be in the range of 60 μm to 70 μm. The tensile strength $\sigma_{BRK}$ of the polypropylene film 10 may be e.g. in the range of 30 N/mm² to 40 N/mm² in the machine direction (MD) of the film, and the tensile strength $\sigma_{BRK}$ of the polypropylene film 10 may be e.g. in the range of 20 N/mm² to 30 N/mm² in the cross machine direction (CD) of the film. The elongation $E_{BRK}$ of the polypropylene layer 10 at break may be e.g. in the range of 550% to 650% in the machine direction (MD). The elongation $E_{BRK}$ of the polypropylene layer 10 at break may be e.g. in the range of 500% to 600% in the cross machine direction (CD).

The layer 10 may be produced e.g. by casting. The machine direction (MD) refers to the direction of movement of the film when the film is produced by a production apparatus. The cross machine direction (CD) is perpendicular to the machine direction (MD). The layer 10 may be produced e.g. such that the layer 10 is not significantly stretched during said producing.

The composition of the adhesive layer 20 may be selected such that the adhesive layer 20 forms a sufficiently strong bond between the carrier layer 10 and the varnished surface of the cardboard. The adhesive layer 20 may comprise e.g. a water-based polymer composition. In an embodiment, the adhesive may be selected such that the adhesive is approved for use in pharmaceutical applications. The adhesive may be selected such that the adhesive is approved for use with foodstuff packages.

The strength of the bond between the adhesive and the varnished surface of the cardboard may increase after the label has been attached to the package. For example, a sufficient strength of the bond between the label and the package may be attained e.g. after two hours has elapsed from the time when the adhesive was brought into contact with the varnished cardboard.

In an embodiment, the carrier layer 10 and/or the adhesive layer 20 of the label 100 may comprise an optical brightener in order to facilitate the use of machine vision. A substantially transparent label 100 may comprise an optical brightener. The optical brightener may emit light by fluorescence when illuminated by ultraviolet light. The optical brightener may be substantially invisible to human eyes when illuminated by visible light. For example, the labels 100 may be attached to packages 200 by using machine vision. A light source may illuminate the label, and a camera system may be arranged to detect the presence and/or position of a label by detecting light received from the optical brightener.

SX, SY and SZ denote orthogonal directions.

Figure 2B:
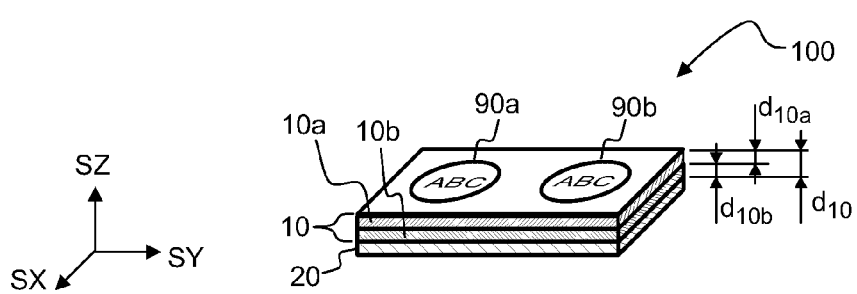
FIG. 2b shows, by way of example, in a three dimensional view, a sealing label, which comprises several sublayers.

Referring to FIG. 2b, the carrier layer 10 of the label 100 may comprise two or more sublayers 10a, 10b. The properties of a first sublayer 10a may be different from the properties of a second sublayer 10b. The first sublayer 10a may have a thickness $d_{10a}$. The second sublayer 10b may have a thickness $d_{10b}$. The carrier layer 10 may comprise e.g. two or more layers 10a, 10b of polypropylene films, which have been laminated together.

FIG. 2c shows, in a top view, the label 100 of FIG. 2a or 2b. The label 100 may have an initial length $L_0$ and an initial width $w_0$. In an embodiment, the perimeter of the label 100 may be used as a visual stretching indicator. A marking 90a of the label 100 may have an initial length $L_{90a}$ and an initial width $w_{90a}$. In an embodiment, the marking 90a, 90b may be used as a visual stretching indicator. A first dimension (e.g. $L_0$ or $L_{90a}$) of a stretching indicator may be substantially equal to a second dimension (e.g. $w_0$, $w_{90a}$) of a stretching indicator so as to facilitate visual comparison of the first dimension with the second dimension. The first dimension may be substantially perpendicular to the second dimension.

Referring to FIG. 2d, the label 100 may initially have e.g. a substantially circular shape. The initial perimeter of the label 100 may be substantially circular. Consequently, the perimeter of the label 100 may be easily used as a visual stretching indicator. A person or an optical apparatus may easily detect whether the label has been stretched by comparing the length ($L_0$) of the label with the width ($w_0$) of the label.

Referring to FIG. 2e, the label 100 may have rounded corners in order to reduce the risk that a corner of the label would be damaged when the edge of the label occasionally collides against a foreign object. In an embodiment, the label 100 may have a substantially square shape with rounded corners such that the length of the label is substantially equal to the width of the label.

Figure 3B:
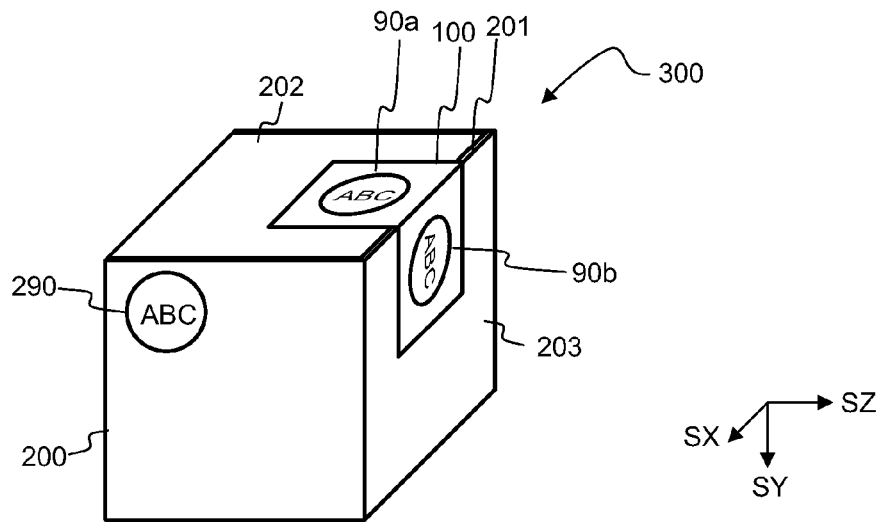
FIG. 3b shows, by way of example, in a three dimensional view, the combination of the package and the sealing label.

Referring to FIGS. 3a and 3b, the label 100 may be attached to a package 200 to form a combination 300. The combination 300 may be called e.g. as a sealed package. The package may be e.g. a cardboard box. The package may comprise one or more walls 203. The package may comprise one or more covers 201. The package may comprise a lid 202, which may be joined to a side of the package by a flexible hinge.

The package 200 may comprise an opening joint 201. The opening joint 201 may be e.g. a sliding joint defined by a lid 202 and a side wall 203. When the joint 201 is not sealed with the label, the joint 201 may be opened and closed several times without causing visual damage to the package. The label 100 may be attached to the package 200 such that the opening joint 201 is located between two attachment regions REG1, REG2. SZ may denote a direction, which is perpendicular to the outer surface of the varnished cardboard in the region REG1.

The varnished cardboard of the package 200 may comprise e.g. more than 50% by weight cellulose fibers. The thickness of the cardboard may be e.g. in the range of 0.1 mm to 1.0 mm. The varnished cardboard may be partly impregnated with the varnish. The varnished cardboard may comprise a layer, which is not impregnated with varnish. A surface of the varnished cardboard may comprise one or more markings 290, which have been produced e.g. by printing or embossing. A surface of the varnished cardboard may comprise one or more holograms.

The package 200 may contain a substance. The substance may be a product. The package 200 may be suitable for containing said substance. The package 200 may comprise one or more markings 290 associated with said substance. The markings 290 of the package 200 may indicate e.g. that the package contains a pharmaceutical product. The sealed package 300 may contain e.g. a pharmaceutical product. The markings 290 of the package 200 may indicate e.g. that the package contains a medicine. The sealed package 300 may contain e.g. a medicine. The markings 290 of the package 200 may indicate e.g. that the package contains foodstuff. The sealed package 300 may contain e.g. a foodstuff. The package 200 may contain a substance selected from the group consisting of medicine, cosmetic product, and foodstuff.

The package 200 may comprise an opening portion. The opening portion may be implemented by an opening joint, which can be opened without damaging the package 200.

However, an opening portion may also be implemented so that the opening portion cannot be opened without permanently damaging the opening portion. For example, an end user may need to tear or cut the opening portion in order to open the package 200. The opening portion may be perforated in order to facilitate tearing and/or in order to indicate the position of the opening portion to the end user. The opening portion may be optionally sealed with the label 100 also when the opening portion cannot be opened without permanently damaging the opening portion. However, in this case sealing with the label is not necessary because opening of the opening portion may cause visually detectable damage also in the situation where the sealing label has not been attached to the opening portion.

Figure 3C:
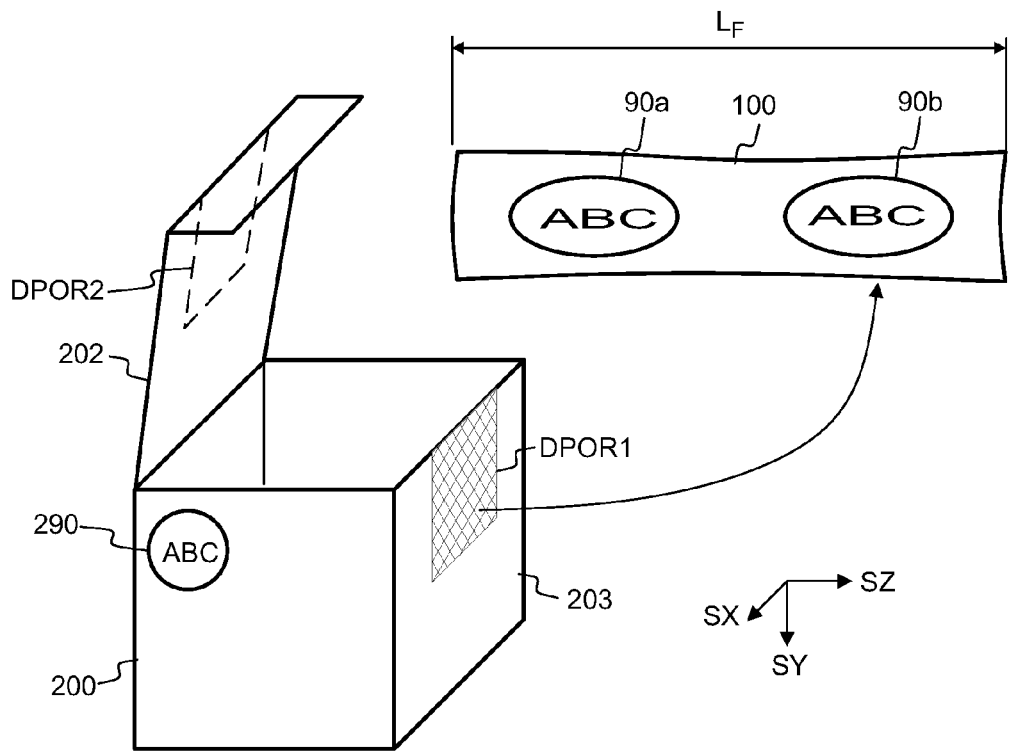
FIG. 3c shows, by way of example, in a three dimensional view, the package and the sealing label after the sealing label has been separated from the package.

Referring to FIG. 3c, the sealed package 300 may be opened e.g. by tearing the label 100 away from the package 200. The properties of the label 100 may be selected such that the pulling the label 100 away from the package 200 causes permanent stretching of the label 100 and also visually alters the package 200. The attachment regions REG1, REG2 of the package may be converted into damaged portions DPOR1, DPOR2. The label 100 may have a final length $L_F$ after it has been separated from the package 200. The final length $L_F$ of the label 100 may be substantially greater than the initial length $L_0$ of said label 100. The stretching of the label 100 may be easily detected by comparing one or more dimensions of the label with a reference dimension. In an embodiment, one of the markings 290 of the package may define said reference dimension. A method of checking the authenticity of the sealed package 300 may comprise comparing a dimension of the label 100 with a reference dimension of a reference marking 290.

In an embodiment, possible stretching of the label 100 may be detected by comparing a marking 90a of the label 100 with a marking 290 of the package.

In an embodiment, the label 100 may also be arranged to close an aperture (i.e. opening) of the package such that the aperture cannot be opened without causing permanent damage to the label 100 and to the package.

Figure 4A:
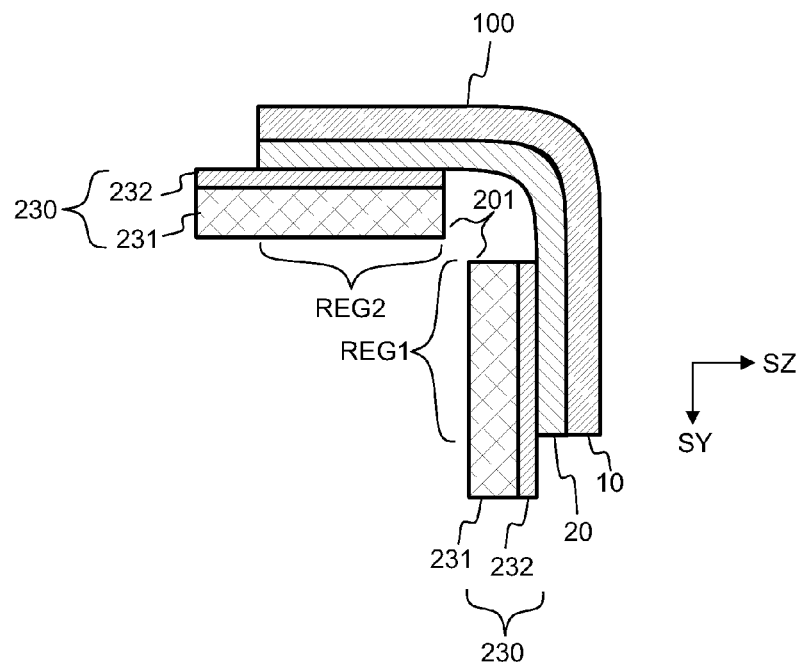
FIG. 4a shows, by way of example, in a cross-sectional side view, the sealing label attached to the package.

FIG. 4a shows a label 100, which has been attached to a package 200, which comprises varnished cardboard 230. The varnished cardboard 230 may comprise cardboard material 231 covered with varnish 232. The varnished cardboard 230 may comprise a varnish layer 232 and cardboard material 231. The adhesive layer 20 of the label 100 may be in contact with the varnish 232.

The label 100 may be attached to a first attachment region REG1 and to a second attachment region REG2 of the package 200. The label 100 may be attached to the package such that an opening joint 201 of the package is located between the first attachment region REG1 and the second attachment region REG2. For example, the first attachment region REG1 may be located on a side 203 of the package, and the second attachment region REG2 may be located on a lid or cover 202 of the package 200. The label 100 may be attached to the package such that the label 100 cannot be separated from the package without separating the label 100 from the first attachment region REG1 and from the second attachment region REG2. The label 100 may be attached to the package such that the opening joint 201 cannot be opened without breaking the label 100, without damaging the package, and/or without separating the label 100 from at least one of the first attachment region REG1 and the second attachment region REG2.

The varnished cardboard 230 may comprise a first layer 231 and a second layer 232. The first 231 layer may comprise cardboard material. The second layer 232 may consist essentially of varnish, or the second layer 232 may comprise cellulose fibers impregnated with the varnish. The second layer 232 may be the outermost layer of the varnished cardboard 230.

The varnish may be e.g. water-based acrylate varnish or UV-curable varnish. An UV-curable varnish may be applied to the cardboard material and cured by using ultraviolet light. The varnish may be approved for use in pharmaceutical packages.

The first 231 layer of the varnished cardboard 230 may comprise cellulose fibers. The first 231 layer may comprise e.g. more than 50% by weight cellulose fibers. The concentration of varnish in the first layer 231 may be low. For example, the concentration of varnish in the first layer 231 may be e.g. lower than 10% by weight, lower than 1% by weight, or even lower than 0.1% by weight. The layers 231, 232 of the varnished cardboard 230 may optionally comprise one or more sub-layers. For example, the first layer 231 may comprise two or more sub-layers made from different types of pulp. For example, the first layer 231 may comprise a first sub-layer made from bleached chemical pulp, and a second sub-layer made from chemi-thermo-mechanical pulp. For example, the first layer 231 may comprise a first sub-layer made from bleached chemical pulp, a second sub-layer made from bleached chemi-thermo-mechanical pulp, and a third sub-layer made from bleached chemical pulp such that the second sub-layer is located between the first sub-layer and the second sub-layer. For example, the second layer 232 may comprise two or more sub-layers, which comprise different types of varnish. The second layer 232 may comprise e.g. a first sub-layer which comprises a first varnish having a first composition, and a second sub-layer which comprises a second varnish having a second composition.

The varnished cardboard 230 may be e.g. fully coated folding boxboard.

Figure 4B:
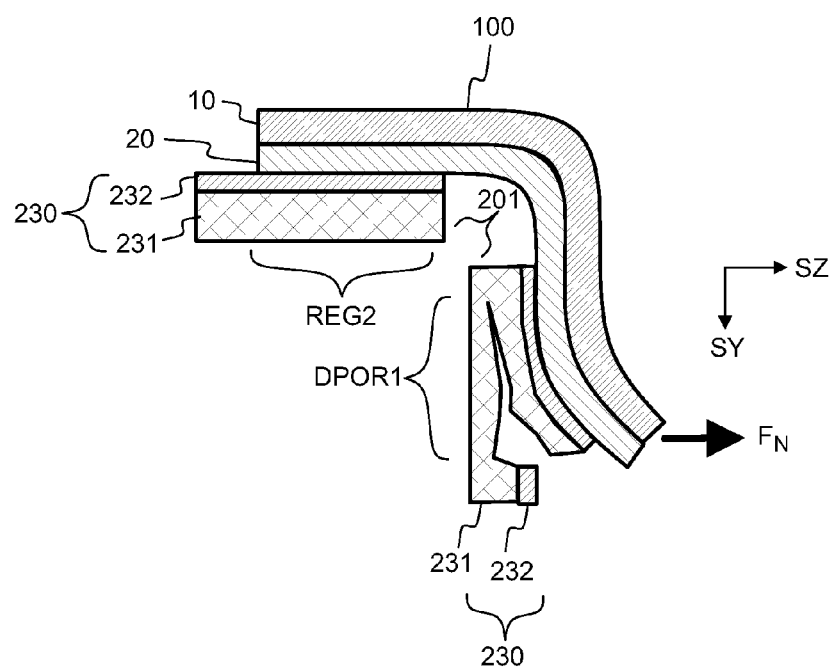
FIG. 4b shows, by way of example, in a cross-sectional side view, separating the sealing label from the package.

Referring to FIG. 4b, the properties of the label 100 may be selected such that an attempt to separate the label 100 from the attachment region REG1 causes visually detectable irreversible damage to the cardboard material 230. The label 100 may be pulled away from the attachment region REG1 by a pulling force $F_N$. Pulling the label 100 away from the first attachment region REG1 may convert the first attachment region REG1 into a first damaged region DPOR1. Pulling the label 100 away from the second attachment region REG2 may convert the second attachment region REG2 into a second damaged region DPOR2 (FIG. 3c).

The direction SZ may denote a direction, which is perpendicular to the attachment region REG1. The pulling force $F_N$ may be substantially perpendicular to the attachment region REG1. The pulling force $F_N$ may be parallel to the direction SZ. The pulling force may have a component $F_N$, which is perpendicular to the attachment region REG1. The pulling force $F_N$ may be distributed by the label 100 and the by varnish layer 232 to a cross-sectional area such that the pulling force $F_N$ creates tensile stress within the cardboard material 231. The tensile stress caused by the pulling force $F_N$ in the cardboard material 231 may exceed the breaking strength $\sigma_{TS}$ of the cardboard material 231. The cardboard material 231 may have a relatively low breaking strength in the direction, which is perpendicular to the outer surface of the varnish 232. The breaking strength $\sigma_{TS}$ may denote the ultimate tensile strength $\sigma$ of the cardboard material 231 in the direction (SZ), which is perpendicular to the outer surface SRF4 of the varnish 232 of the attachment region REG1. The direction SZ may also be called as the z-direction. The strength $\sigma_{TS}$ may denote the z-directional tensile strength of the varnished cardboard 230.

The damaged portion DPOR1 may be a pit (i.e. a crater). The cardboard material 231 may be torn apart when the label 100 is pulled such that a piece of cardboard is separated from the package 200 and such that a pit DPOR1 is formed on the package 200. In principle, the shape of the separated piece could match with the shape of the pit DPOR1 such that the piece could be glued back to its original position. Consequently, a potential counterfeiter could try to replace the contents of the package 200 and glue the separated piece back to the pit DPOR1. However, the label 100 may still be deformed such that the label 100 indicates that the package 200 has been tampered. The separated piece of the cardboard material may be firmly adhered to the label 100 such that it would be difficult to separate the piece from the label 100 and to glue only the piece back to the pit without the stretched label 100.

Figure 4C:
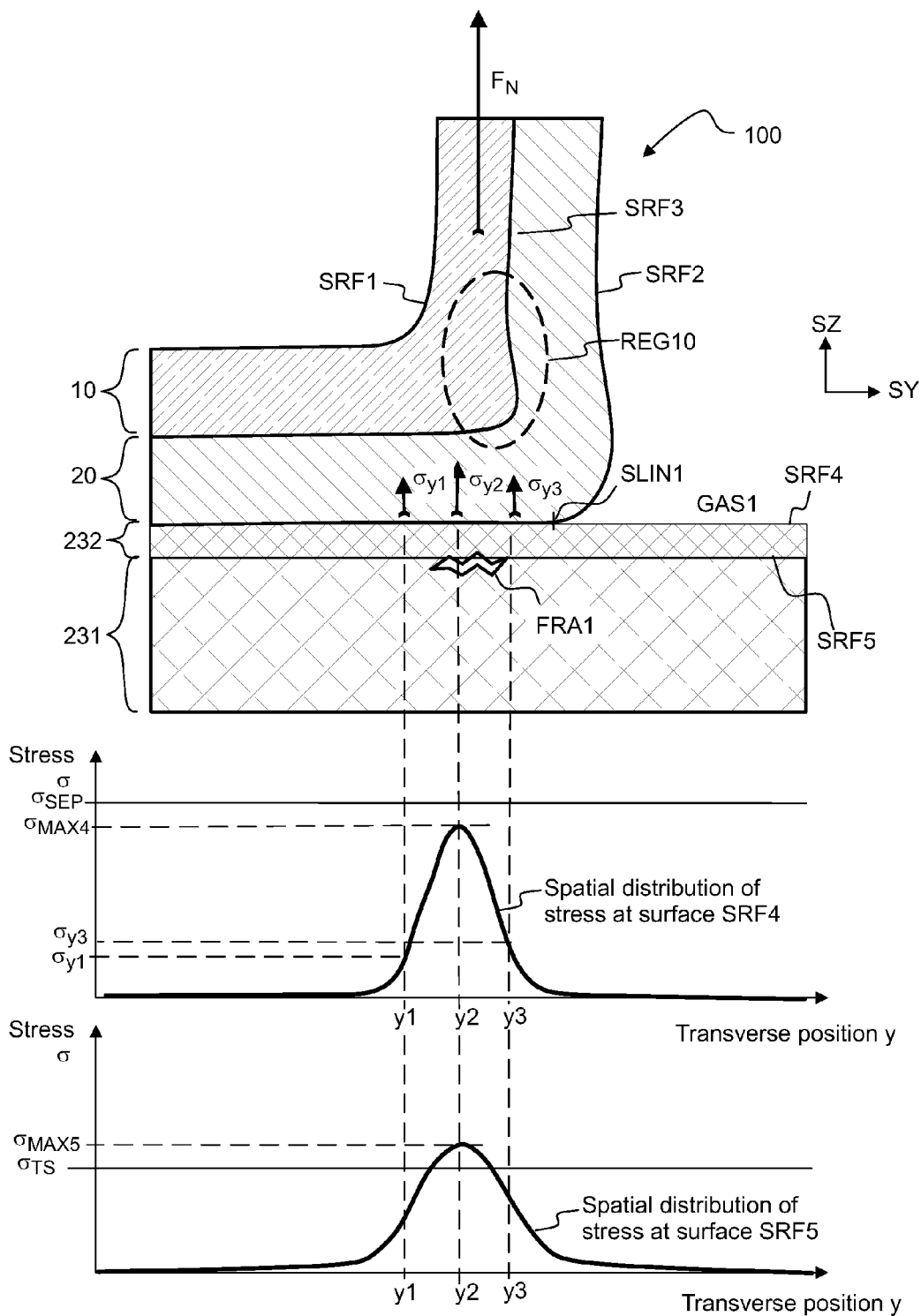
FIG. 4c shows, by way of example, in a cross-sectional side view, spatial distribution of stress when separating the sealing label from a package.

Referring to FIG. 4c, the carrier layer 10 may be locally stretched e.g. in a deformation region REG10 when the label 100 is pulled away from the surface of the varnished cardboard by a pulling force $F_N$. The large deformation of the carrier layer 10 may broaden and equalize the spatial distribution of stress $\sigma$ at the interface between the adhesive layer 20 and the varnished layer 232 so that the adhesive layer 20 may remain firmly adhered to the varnished layer 232 during the pulling. The large deformation of the carrier layer 10 may improve adhesion of the label 100 to the varnished layer 232. Consequently, the label 100 may transmit a greater damaging force to the cardboard material 231 beneath the varnished layer 232.

The pulling force $F_N$ may cause stress in the carrier layer 10, stress in the adhesive layer 20, stress in the varnished layer 232, and stress in the cardboard material 231. The carrier layer 10 may have an upper surface SRF1, and the adhesive layer 20 may have a lower surface SRF2. The carrier layer 10 may meet the adhesive layer at an interface SRF3. The varnished layer 231 may have an upper surface SRF4. SRF5 may denote an interface where the varnished layer 232 meets the cardboard material 231. In an embodiment, the surface of the cardboard may be impregnated with the varnish. The concentration of the varnish may gradually decrease with increasing depth. For example, the concentration of the varnish at the interface SRF5 may e.g. 10% of the concentration of the varnish at the surface SRF4. In an embodiment, the concentration of the varnish may change abruptly at the interface SRF5. The cardboard material and the varnish may meet at the interface SRF5.

The pulling force $F_N$ may cause stress at the surface SRF4. The stress at the surface SRF4 may separate the adhesive layer 20 from the surface SRF4 varnished layer 232. The pulling force $F_N$ may cause stress at the interface SRF5. The stress at the interface SRF5 may break the cardboard material. The stress at the interface SRF5 may cause a fracture FRA1. SLIN1 denotes a separation line where the adhesive layer 20 separates from the varnished layer 232. The separation line SLIN1 denotes the line where the adhesive layer 20 meets the varnished layer 232 and the ambient gas GAS1.

The deformation region REG10 may spatially distribute the pulling force $F_N$. Thanks to the stretching of the carrier layer 10, the stress caused by the pulling force $F_N$ may be distributed to a relatively wide area. The stress at the surface SRF4 may have a value $\sigma_{y1}$ at a spatial position $y_1$, a value $\sigma_{y2}$ at a spatial position $y_2$, and a value $\sigma_{y2}$ at a spatial position $y_3$. The stretching of the carrier layer 10 may spatially distribute the stress such that the maximum stress $\sigma_{MAX4}$ at the surface SRF4 remains lower than the minimum detaching stress $\sigma_{SEP}$ of the bond between the adhesive layer 10 and the varnished layer. Consequently, the label 100 may remain firmly attached to the varnished layer when pulling with the force $F_N$. Pulling with said force $F_N$ may cause stress also in the cardboard material 231. The maximum stress $\sigma_{MAX5}$ at the interface SRF5 may exceed the tensile strength $\sigma_{TS}$ of the cardboard material. Consequently, the label 100 may remain firmly attached to the varnished layer when the cardboard material below the varnished layer breaks. The label 100 may be irreversibly stretched due to pulling with said force $F_N$. The breaking of the cardboard material may also be called e.g. as catastrophic delamination or as cardboard failure.

Figure 4D:
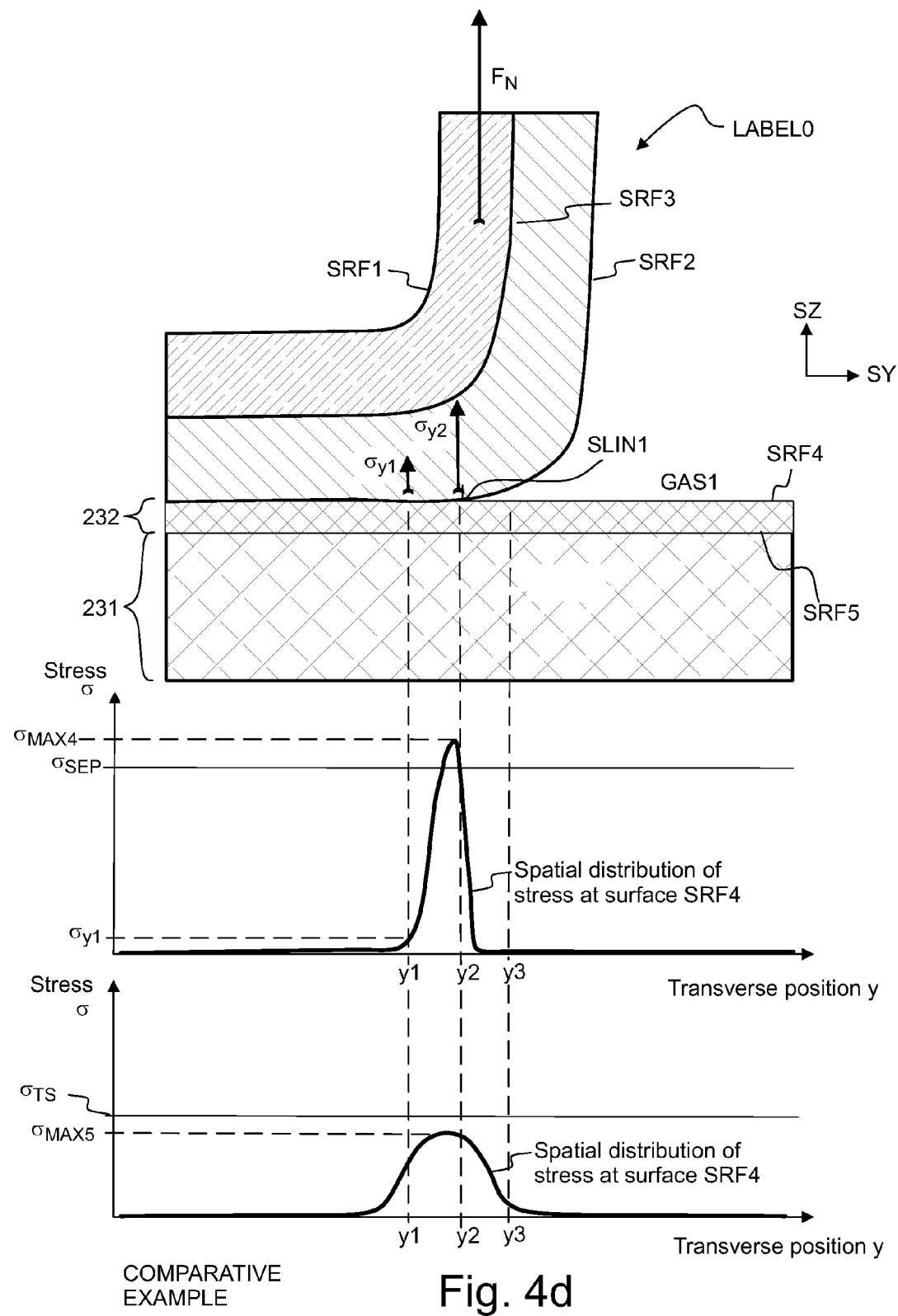
FIG. 4d shows, by way of example, in a cross-sectional side view, spatial distribution of stress when separating a conventional label from a package, FIG. 5 show by way of example, the relative length of the sealing label as the function of instantaneous pulling force.

FIG. 4d shows a comparative example where a conventional label LABEL0 has a low capability to stretch. The conventional label LABEL0 may be pulled with a force $F_N$ in order to separate the conventional label LABEL0 from the surface SRF4. The spatial distribution of stress at the surface SRF4 may be narrow and may have a high maximum value $\sigma_{MAX4}$. The maximum value $\sigma_{MAX4}$ may be attained at a transverse position, which close to the separation line SLIN1. The maximum stress $\sigma_{MAX4}$ at the surface SRF4 may exceed the breaking strength $\sigma_{SEP}$ of the bond between the adhesive layer 20 and the surface SRF4, and the adhesive bond may fail such that the cardboard material remains undamaged. The conventional label LABEL0 may be detached from the surface SRF4 before the maximum stress $\sigma_{MAX5}$ at the interface SRF5 reaches the tensile strength $\sigma_{TS}$ of the cardboard material. Consequently, the conventional label may be separated from the varnished cardboard such that the conventional label is not deformed, and such that the cardboard material remains undamaged.

Figure 5:
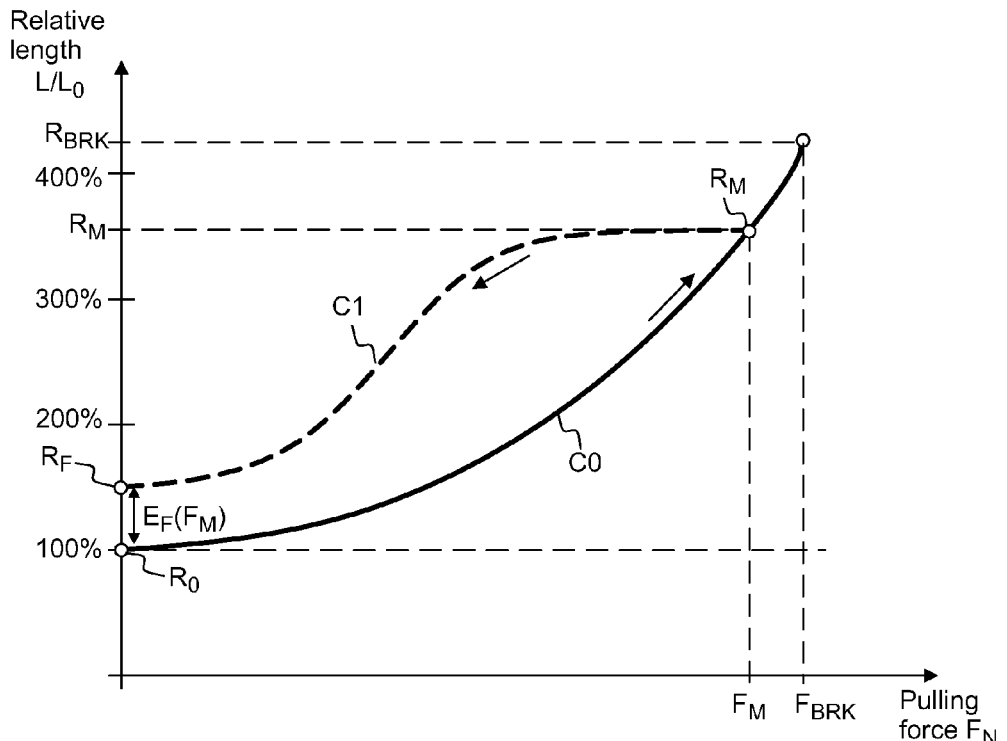

FIG. 5 shows, by way of example, the relative length $L/L_0$ of the label 100 as the function of the pulling force $F_N$. The label 100 may be pulled in the direction SZ by using the pulling force $F_N$. For example, an end of the label 100 may be pulled in the direction SZ by using the pulling force $F_N$. The average internal stress $\sigma$ in the carrier layer 10 of the label 100 may be substantially equal to $F_N/(w_{10} \cdot d_{10})$, where $w_{10}$ denotes the width of the carrier layer 10, and $d_{10}$ denotes the thickness of the carrier layer 10.

The curve C0 shows the relative length $L/L_0$ of the label 100 as the function of the pulling force $F_N$ in a situation where the initial length of the label 100 is $L_0$ and the pulling force $F_N$ continuously increases (with time). The curve C1 shows the relative length $L/L_0$ of the label 100 as the function of the pulling force $F_N$ in a situation where the pulling force $F_N$ continuously decreases from a maximum value $F_M$ to a zero value.

$R_0$ denotes the initial relative length $L/L_0$ of the label 100. The initial relative length $R_0$ is equal to 100%. $R_F$ denotes the final relative length $L_F/L_0$ of the label 100 when the pulling force $F_N$ is equal to zero, after the label 100 has been stretched with the maximum pulling force $F_M$. The final relative length $R_F(F_M)$ may be a function of the maximum value $F_M$. The elongation $E_F$ denotes the difference between the final relative length $R_F$ and the initial relative length $R_0$. The elongation $E_F(F_M)$ may be a function of the maximum pulling force $F_M$. The elongation $E_F(F_M)$ may also be called e.g. as the relative residual elongation or as the residual strain. The (final) elongation $E_F(F_M)$ may be defined e.g. by the following equation:

$$E_F(F_M) = L_F(F_M) - L_0/L_0 \cdot 100\% \quad (1)$$

Where $L_F(F_M)$ denotes the final length of the label 100 when the pulling force $F_N$ is equal to zero, after the label 100 has been stretched with the maximum pulling force $F_M$.

$F_{BRK}$ denotes the breaking value of the pulling force $F_N$. The label 100 may be broken into two or more pieces when the pulling force $F_N$ reaches the value $F_{BRK}$. $R_{BRK}$ denotes the relative length $L/L_0$ attained when the pulling force $F_N$ is equal to the breaking value $F_{BRK}$.

Figure 6A:
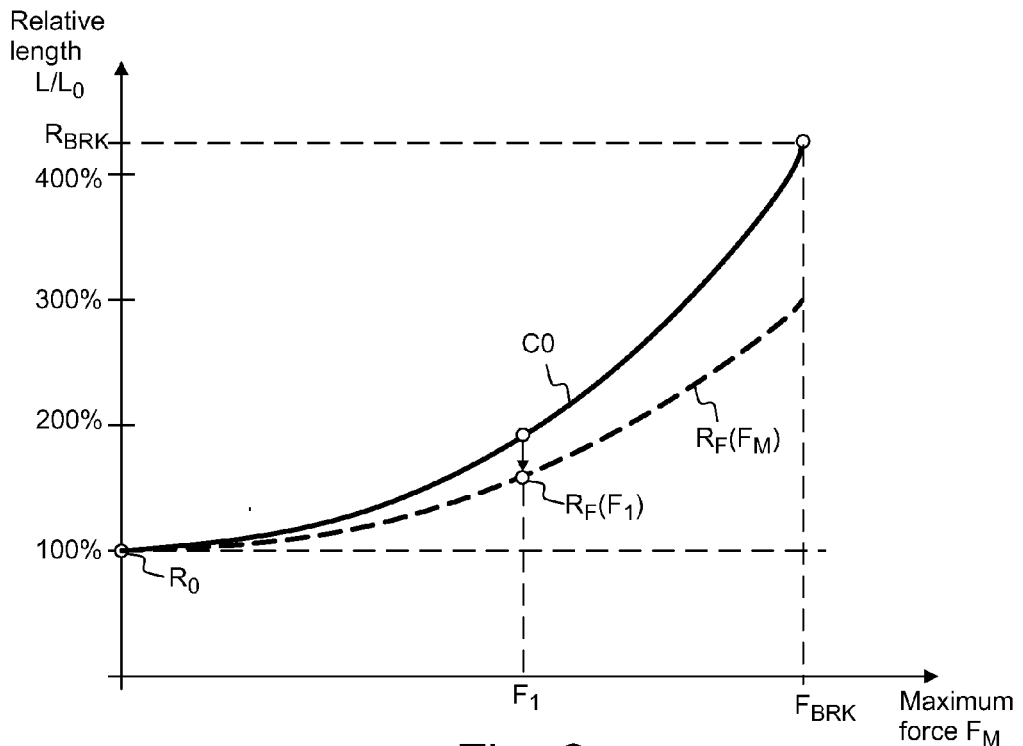
FIG. 6a shows, by way of example the maximum relative length and the final relative length of the sealing label as the function of the maximum value of the pulling force.

The curve $R_F(F_M)$ of FIG. 6a shows, by way of example, the final relative length $R_F(F_M)$ of the label 100 as the function of the maximum pulling force $F_M$.

For example, the label 100 may be stretched such that the maximum pulling force $F_M$ is equal to $F_1$. The label 100 may shrink when the pulling force $F_M$ is reduced to zero from the maximum value $F_1$, such that the final relative length $R_F(F_M)$ of the label 100 is equal to $R_F(F_1)$.

The final elongation $E_F$ of the label 100 may be determined by subtracting the initial relative length $R_0$ (=100%) of the label 100 from the final relative length $R_F$ of the label 100. Thus, the final elongation $E_F(F_M)$ is related to the final relative length $R_F(F_M)$ according to the following equation:

$$E_F(F_M) = R_F(F_M) - 100\% \quad (2)$$

The maximum length $L_M$, the maximum relative length $R_M$ and the maximum elongation $E_M(F_M)$ may be attained when the label 100 is pulled by the maximum force $F_M$. The maximum elongation $E_M(F_M)$ is related to the maximum relative length $R_M(F_M)$ according to the following equation:

$$E_M(F_M) = R_M(F_M) - 100\% \quad (3)$$

Figure 6B:
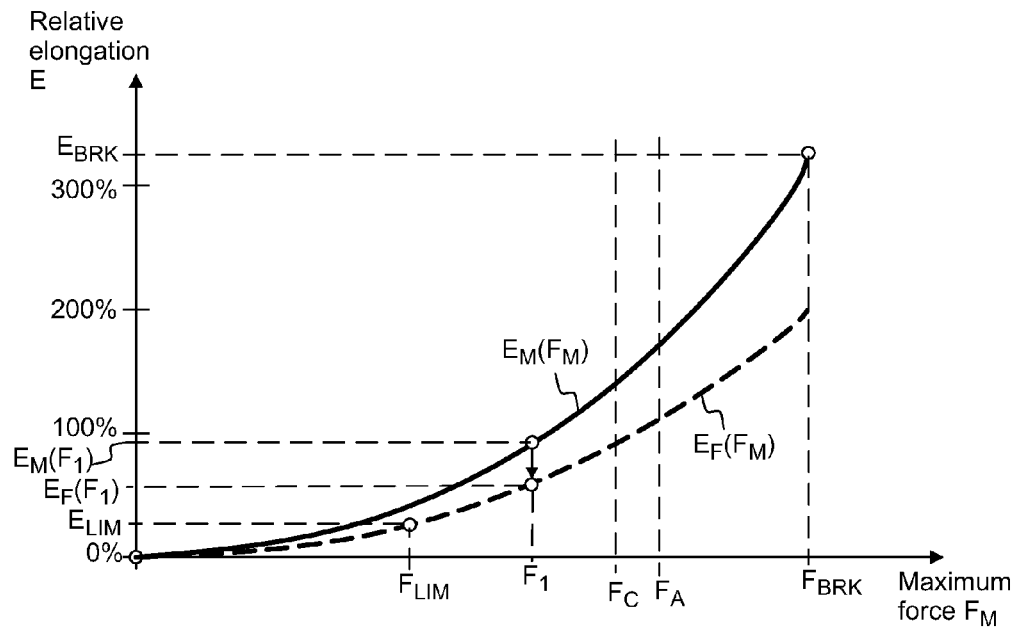
FIG. 6b shows, by way of example, the maximum elongation and the final elongation of the sealing label as the function of the maximum value of the pulling force.

FIG. 6b shows the maximum elongation $E_M(F_M)$ as the function of the maximum force $F_M$, and the final elongation $E_F(F_M)$ as the function of the maximum force $F_M$.

The irreversible deformation of the label 100 may be easily visually detectable after the maximum pulling force $F_M$ has been greater than a limit value $F_{LIM}$. The elongation $E_F(F_{LIM})$ at the limit value $F_{LIM}$ may be e.g. equal to 30%. The limit value $F_{LIM}$ may be defined to be e.g. the value of the pulling force $F_M$, which causes an elongation $E_F$, which is equal to 30%.

$F_C$ may denote the breaking force $F_C$ of the cardboard material 231. The breaking force $F_C$ may mean the minimum value of the pulling force $F_M$, which causes visually detectable permanent damage to the cardboard material 231 when the label 100 is pulled away from the attachment region POR1 of the varnished cardboard. The breaking force $F_C$ may mean the minimum value of the pulling force $F_M$, which tears a piece away from the cardboard material 231. Pulling the label 100 away from the attachment region POR1 of the varnished cardboard with the breaking force $F_C$ may break the cardboard material 231.

$F_A$ may denote the detaching force of the adhesive of the adhesive layer 20. The detaching force $F_A$ may mean the minimum value of the pulling force $F_M$, which is sufficient to separate the label 100 from the varnished surface of the attachment region POR1. The detaching force $F_A$ may also be called e.g. as the de-bonding force.

The properties of the label 100 may be selected such that an attempt to separate the label 100 from the varnished cardboard causes irreversible damage both to the label 100 and to the varnished cardboard. The properties of the label 100 may be selected such that the label cannot be separated from the varnished cardboard without irreversibly visually detectable stretching the label, and the label cannot be separated from the varnished cardboard without causing irreversible visually detectable tearing of the cardboard material.

The label 100 may have a high breaking strength in order to ensure that the cardboard is permanently damaged before the label is broken into pieces. The label may be arranged to tear the cardboard material apart at the lower force than what is required to break the label.

The adhesive layer 20 may be firmly adhered both to the carrier layer 10 and to the varnish 232 in order to ensure that the cardboard is permanently damaged before the adhesive layer 20 is detached.

The sealing label 100 may comprise the carrier layer 10 and the adhesive layer 20, and the dimensions $w_0$, $d_{10}$ of the label 100, the material of the carrier layer 10, and the composition of the adhesive layer 20 may be selected such that:

the minimum deformation force $F_{LIM}$ of the label 100 is smaller than the breaking force $F_C$ of the cardboard material 231, the minimum detaching force $F_A$ of the adhesive 20 from the varnished cardboard 230 is greater than the breaking force $F_C$ of the cardboard material 231, and the minimum detaching force $F_A$ of the adhesive 20 is smaller than the breaking force $F_{BRK}$ of the label 100.

The sealing label 100 may comprise the carrier layer 10 and the adhesive layer 20. The thickness ($d_{10}$) of the carrier layer (10), the material of the carrier layer (10), and the composition of the adhesive layer (20) may be selected such that:

the minimum deformation force ($F_{LIM}$) of the label (100) is smaller than the breaking force ($F_C$) needed to break the cardboard material (230), the minimum detaching force ($F_A$) of the adhesive (20) from the varnished cardboard (230) is greater than the breaking force ($F_C$), and the minimum detaching force ($F_A$) of the adhesive (20) is smaller than the breaking force ($F_{BRK}$) needed to break the label (100).

In principle, someone might try to separate the label 100 from the package 200 by heating the label 100 such that the bond between the label 100 and the package 200 is weakened. $T_S$ may denote the temperature of the label 100 during pulling with the force $F_M$. The temperature $T_S$ may be called e.g. as the separation temperature. The material of the carrier layer 10 may be selected such that the carrier layer 10 is stretched more easily at the elevated separation temperature $T_S$.

The dimensions $w_0$, $d_{10}$ of the label 100, the material of the carrier layer 10, and the composition of the adhesive layer 20 may be selected such that the label 100 may provide the tamper-evident properties at cold temperatures and at elevated temperatures.

In an embodiment, the following conditions may be fulfilled at all temperatures $T_{100}$, which are in the range of $-20°$ C. to $50°$ C.

- the minimum deformation force ($F_{LIM}$) of the label (100) is smaller than the breaking force ($F_C$) of the cardboard material (231),
- the minimum detaching force ($F_A$) of the adhesive (20) from the varnished cardboard (230) is greater than the breaking force ($F_C$) of the cardboard material (231), and
- the minimum detaching force ($F_A$) of the adhesive (20) is smaller than the breaking force ($F_{BRK}$) of the label (100).

The bond between the adhesive layer 20 and the carrier layer 10 may be stronger than the bond between the adhesive layer 20 and the varnish 232.

The carrier layer 10 may have substantially similar stretching properties in a transverse direction (e.g. in the direction SX) and in a longitudinal direction (e.g. in the direction SZ). Consequently, an attempt to separate the label 100 by longitudinal pulling may cause permanent stretching of the label 100, and an attempt to separate the label 100 by transverse pulling may also cause permanent stretching of the label 100.

For maximum forces greater than $F_{LIM}$, the ratio $E_F(F_M)/E_M(F_M)$ may be e.g. greater than 30%. For maximum forces greater than $F_{LIM}$, the ratio $E_F(F_M)/E_M(F_M)$ may be e.g. in the range of 30% to 80%.

Figure 6C:
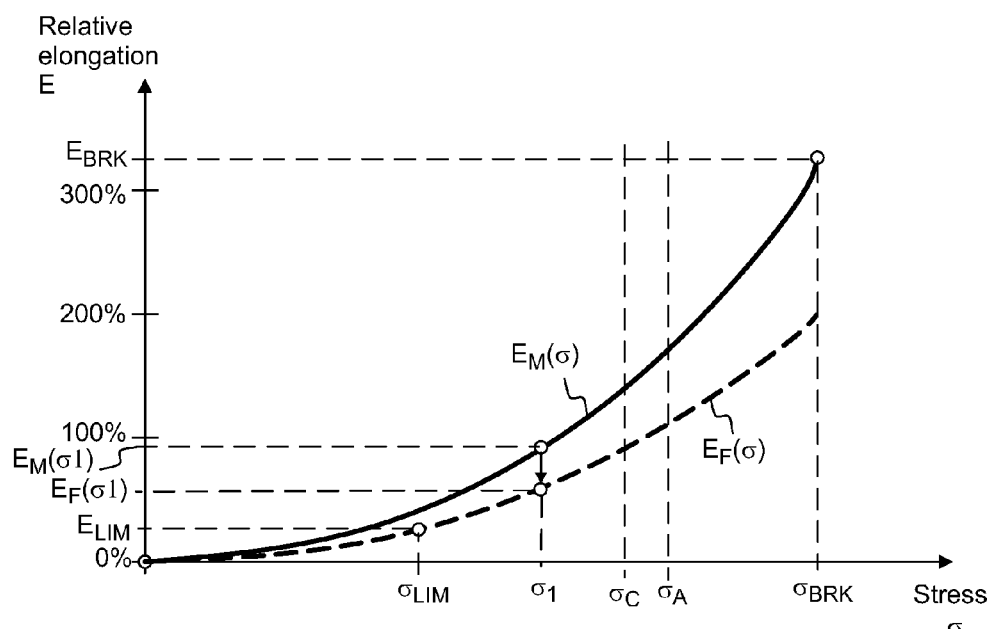
FIG. 6c shows, by way of example, the elongation as the function of the tensile stress of the carrier layer.

FIG. 6c shows the maximum elongation $E_M(\sigma)$ as the function of the maximum pulling stress $\sigma$, and the final elongation $E_F(F_M)$ as the function of the maximum pulling stress $\sigma$. Pulling the label 100 or a label web with a force $F_N$ may cause a pulling stress $\sigma$ in the carrier layer 100.

The label 100 or a label web may break when pulled with the force $F_{BRK}$ such that the stress $\sigma$ of the carrier layer 10 reaches the tensile strength $\sigma_{BRK}$.

For example, pulling the label 100 or a label web with a force F1 may cause a pulling stress $\sigma_1$ in the material of the carrier layer 10, and final elongation $E_F(\sigma_1)$ of the carrier layer 10.

The irreversible deformation of the label 100 or a label web may be easily visually detectable after the pulling stress $\sigma$ has been greater than a minimum deformation stress value $\sigma_{LIM}$. The elongation $E_F(\sigma_{LIM})$ at the minimum deformation stress value $\sigma_{LIM}$ may be e.g. equal to 30%. The minimum deformation stress value $\sigma_{LIM}$ may be defined to be e.g. the value of the stress $\sigma$ when the label 100 or a web is pulled with a pulling force $F_M$, which causes an elongation $E_F$, which is equal to 30%.

$\sigma_C$ may denote the minimum breaking stress value of the carrier layer 10 in a situation where the label 100 cut from the web1 WEB1 is pulled with the pulling force $F_C$, which causes breaking of the cardboard material 231. Pulling the label 100 or a web away from the attachment region POR1 of the varnished cardboard so that the pulling stress $\sigma$ reaches the value $\sigma_C$ may break the cardboard material 231. The breaking stress value $\sigma_C$ may be higher than the tensile strength $\sigma_{TS}$ of the cardboard material 231. The varnished layer 232 and the adhesive layer 10 may spatially distribute the stress such that the breaking stress value $\sigma_C$ may be higher than the tensile strength $\sigma_{TS}$ of the cardboard material 231.

$\sigma_A$ may denote a minimum detaching stress value of the carrier layer 10 in a situation where the label 100 cut from the web WEB1 is pulled by a force $F_A$, which causes separation of the adhesive layer 20 from the varnished layer 232. The detaching stress value $\sigma_A$ may be higher than the tensile strength of the bond between the adhesive layer 20 and the varnished layer 232. The adhesive layer 10 may spatially distribute the stress such that the detaching stress value $\sigma_A$ may be higher than the tensile strength of the bond between the adhesive layer 20 and the varnished layer 232

The parameters shown in FIGS. 6a to 6c may be measured e.g. by peeling a test label cut from the web WEB1 from a varnished cardboard at the peeling rate of 100 mm/min.

For measuring the detaching stress value $\sigma_A$, the cardboard material of the varnished cardboard may be artificially reinforced e.g. by impregnating the whole cardboard material with a suitable polymer or epoxy, in order to prevent breaking of the cardboard during the peeling test.

For determining and/or measuring the parameters shown in FIGS. 6a to 6c, the varnish of the varnished layer 232 may be e.g. water-based acrylate varnish, and the z-directional tensile strength of the varnished cardboard material 230 may be e.g. substantially equal to 300 kPa. The Scott bond energy of the varnished cardboard material 230 may be e.g. substantially equal to 130 $J/m^2$. The outermost surface of the varnished cardboard 230 may consist essentially of the water-based acrylate varnish.

The varnished cardboard 230 may be e.g. fully coated folding boxboard approved for containing a medicament, wherein the varnish of the varnished layer 232 may be e.g. water-based acrylate varnish, and the z-directional tensile strength of the varnished cardboard material 230 may be e.g. substantially equal to 300 kPa. The Scott bond energy of the varnished cardboard material 230 may be e.g. substantially equal to 130 $J/m^2$. The outermost surface of the varnished cardboard 230 may consist essentially of the water-based acrylate varnish.

Referring to FIG. 7a, a label web WEB1 may be produced. The web WEB1 may be produced and/or transported e.g. as a sheet or as a roll. A plurality of the labels 100 may be subsequently cut and/or separated from the web WEB1. The materials of the layers 10, 20, and the thickness of the layers 10, 20 may be selected such that the labels 100 may be formed by cutting from the web WEB1. The web WEB1 may comprise a release liner 30 to protect the adhesive layer 20, and/or to facilitate handling of the web. The release liner 30 may have e.g. an anti-adhesion coating to facilitate removal from the adhesive layer 20. The anti-adhesion coating may be e.g. a silicone coating.

Producing a plurality of labels 100 may comprise:
producing a web WEB1, which comprises a carrier layer 10 and an adhesive layer 20, and
separating one or more labels 100 from the web WEB1.

Referring to FIG. 7b, the labels 100 cut from the web WEB1 may comprise the carrier layer 10, the adhesive layer, 20, and the release liner 30. The release liner 30 may be removed before the adhesive layer 20 is brought into contact with the package 200.

The web WEB1 may comprise:
a carrier layer 10, and
an adhesive layer 20,
wherein the thickness $d_{10}$ of the carrier layer 10, the material of the carrier layer 10, and the composition of the adhesive layer 20 may be selected such that:

a minimum deformation stress value $\sigma_{LIM}$ of the carrier layer 10 is smaller than a minimum breaking stress value $\sigma_C$ of the carrier layer 10, a minimum detaching stress value $\sigma_A$ of the carrier layer 10 is greater than the minimum breaking stress value $\sigma_C$ of the carrier layer 10, and the minimum detaching stress value $\sigma_A$ of the carrier layer 10 is smaller than the tensile strength $\sigma_{BRK}$ of the carrier layer 10, wherein the minimum deformation stress value $\sigma_{LIM}$ is the stress of the carrier layer 10 in a situation where a label 100 cut from the web WEB1 is pulled by a pulling force $F_{LIM}$, which causes 30% final elongation of the carrier layer 10; the minimum breaking stress value $\sigma_C$ is the stress of the carrier layer 10 in a situation where a label 100 cut from the web WEB1 is separated from varnished cardboard by a pulling force $F_C$, which causes breaking of the cardboard material; and the minimum detaching stress value $\sigma_A$ is the stress of the carrier layer 10 in a situation where a label cut from the web WEB1 is separated from the surface of a varnished cardboard by a pulling force $F_A$.

The web WEB1 may comprise a plurality of visually detectable stretching indicators 90a, 90b. A first dimension $L_{90a}$ of a stretching indicator 90a may be substantially equal to a second dimension $w_{90a}$ of said stretching indicator 90a so as to allow visual comparison of the first dimension $L_{90a}$ with the second dimension $w_{90a}$. The elongation ($E_{BRK}$) at break of the carrier layer 10 may be higher than or equal to 300%, preferably higher than or equal to 450%. The carrier layer 10 may comprise e.g. polypropylene. The carrier layer 10 may consist essentially of polypropylene.

In an embodiment, the carrier layer 10 of the label 100 may be pharmaceutical grade polypropylene film, the thickness $d_{10}$ of the film may be e.g. substantially equal to 65 μm, the elongation $E_{BRK}$ of the film 10 at break may be e.g. substantially equal to 600%, and the tensile strength $\sigma_{BRK}$ may be e.g. substantially equal to 36 N/mm² in the machine direction (MD). The adhesive layer 20 may comprise e.g. a water-based polymer composition. The adhesive may be selected such that the adhesive is approved for use in pharmaceutical applications.

The effect of the highly stretchable carrier layer was tested experimentally by using sealing labels 100, which comprised a polypropylene film and water-based polymer adhesive. These sealing labels 100 are called herein as the "test labels".

The test labels comprised a pharmaceutical grade polypropylene film, the thickness $d_{10}$ of the film is substantially equal to 65 μm, the elongation $E_{BRK}$ of the film 10 at break is e.g. substantially equal to 600%, and the tensile strength $\sigma_{BRK}$ is substantially equal to 36 N/mm² in the machine direction (MD). The adhesive layer 20 comprised a water-based polymer composition.

The following parameters were measured for the test labels: Loop tack 3.5 N±1.6 N (measured according to the standard FINAT 9). Resistance to shear 1131 min±151 min (measured according to the standard FINAT 8). Dynamic shear 67.7 N±0.9 N (measured according to the standard FINAT 18). Adhesive coat weight from 16 g/m² to 30 g/m² (measured according to the standard FINAT 18).

Tables 1 and 2 summarize experimental test results when the test labels were peeled away from a glass substrate. Conventional labels were used as reference. The label dwell time refers to the time period between bringing the label into contact with the glass surface, and separating the label from the glass surface.

TABLE 1

Pulling force $F_N$ and final relative elongation $E_F$ when peeling the test labels and conventional labels away from a glass surface according to the standard FINAT 1. The width of the label is 25 mm. The peel off speed was equal to 300 mm/min.

| | Label 100 | | Conventional label | |
|---|---|---|---|---|
| Label dwell time | Peeling force [N/25 mm] | Elongation [%] | Peeling force [N/25 mm] | Elongation [%] |
| 20 min | 17 | 50 | 12 | 0 |
| 60 min | 25 | 400 | 12 | 0 |
| 240 min | 27 | 500 | 18 | 0 |

TABLE 2

Pulling force $F_N$ and final relative elongation $E_F$ when separating the test labels and conventional labels from a glass surface according to a modified standard FINAT 1. The modified standard is otherwise similar to the standard FINAT 1, except that the peel off speed is equal to 100 mm/min. The width of the label is 25 mm

| | Label 100 | | Conventional label | |
|---|---|---|---|---|
| Label dwell time | Peeling force [N/25 mm] | Elongation [%] | Peeling force [N/25 mm] | Elongation [%] |
| 20 min | 21 | 300 | 13 | 0 |
| 60 min | 20 | 300 | 13 | 0 |
| 240 min | 20 | 450 | 13 | 0 |

Table 1 indicates that when using the higher peel off speed (300 mm/min), the strength of the bond between the adhesive layer and the substrate may increase with increasing label dwell time.

Table 2 indicates that when using the low peel off speed (100 mm/min), the strength of the bond between the adhesive layer and the substrate may be substantially independent of the label dwell time.

The width of the test label was 25 mm and the thickness of the test label was 0.056 mm. Consequently, the peeling force of 20 N may cause a strain of 12 N/mm² in the carrier layer 10 of the test label. According to the table 2, this strain may cause an elongation of 450% when the label dwell time is longer than or equal to 240 min. Thus, the strain of 12 N/mm² may cause an elongation, which is greater than or equal to 400% when the label dwell time is longer than or equal to 240 min.

As shown in Tables 1 and 2, the carrier layer 10 of the label 100 may be stretched to a significant degree. The final elongation may be e.g. greater than or equal to 300% when the label dwell time is longer than or equal to 60 min. The stretching of the carrier layer 10 may modify the spatial distribution of the stress at the surface of the substrate such that the bond between the label 100 and the surface of the substrate may be substantially stronger than the bond between the conventional label and the surface of the substrate.

For example, the thickness $d_{10}$ of the carrier layer 10, the material of the carrier layer 10, and the composition of the adhesive layer 20 of the sealing label 100 may be selected such that:

the minimum deformation force $F_{LIM}$ of the label 100 is smaller than the breaking force $F_C$ needed to break the cardboard material 230, the minimum detaching force $F_A$ of the adhesive 20 from the varnished cardboard 230 is greater than the breaking force $F_C$, the minimum detaching force $F_A$ of the adhesive 20 is smaller than the breaking force $F_{BRK}$ needed to break the label 100, and the elongation of the label 100 is greater than or equal to 400% when the label is pulled by a force $F_N$, which causes a strain of 12 N/mm$^2$ in the carrier layer 10 of the label 100.

The thickness of the layer 10 may be measured according to the standard DIN 53370. The tensile strength and the elongation at break may be measured according to the standard DIN EN ISO 527 (1-3). The z-directional tensile strength may be measured according to the standard ISO 15754. The FINAT standards refer to standards approved by the European organization "FINAT". The FINAT is an acronym for "Féderation Internationale des fabricants et transformateurs d' Adhésifs et Thermocollants".

Various aspects are illustrated by the following examples:

Example 1

A label (100) suitable for use on a varnished cardboard (230), the label (100) comprising:
  a carrier layer (10), and
  an adhesive layer (20),
wherein the thickness ($d_{10}$) of the carrier layer (10), the material of the carrier layer (10), and the composition of the adhesive layer (20) have been selected such that:
  a minimum deformation force ($F_{LIM}$) of the label is smaller than a first breaking force ($F_C$) needed to break the cardboard material (231) of the varnished cardboard (230),
  a minimum detaching force ($F_A$) of the label (100) is greater than the first breaking force ($F_C$), and
  the minimum detaching force ($F_A$) is smaller than a second breaking force ($F_{BRK}$) needed to break the label (100),
wherein the first breaking force ($F_C$) is a first pulling force which causes breaking of the cardboard material (231) in a situation where the label (100) is separated from the varnished cardboard (230) by pulling the label (100) with said first pulling force, and the minimum detaching force ($F_A$) is a second pulling force which is needed to separate the adhesive layer (20) of the label (100) from the surface (SRF4) of the varnished cardboard (230) in a situation where the label (100) is pulled with said second pulling force.

Example 2

The label (100) of example 1 comprising one or more visually detectable stretching indicators (90a, 90b).

Example 3

The label (100) of example 1 or 2 wherein a first dimension ($L_{90a}$) of a stretching indicator (90a) is substantially equal to a second dimension ($w_{90a}$) of said stretching indicator (90a) so as to allow visual comparison of the first dimension ($L_{90a}$) with the second dimension ($w_{90a}$).

Example 4

The label (100) according to any of the examples 1 to 3 wherein the label (100) has a substantially smooth and continuous upper surface.

Example 5

The label (100) according to any of the examples 1 to 4 wherein the elongation ($E_{BRK}$) at break of the carrier layer (10) is higher than or equal to 300%, advantageously higher than or equal to 450%, and preferably higher than or equal to 500%.

Example 6

The label (100) according to any of the examples 1 to 5 wherein the carrier layer (10) comprises polypropylene.

Example 7

A combination (300) of a label (100) and a package (200), wherein the package (200) comprises varnished cardboard (230), the label (100) has been attached to the package (200) such that an opening joint (201) is located between two attachment regions (REG1, REG2) of the label (100), the label (100) comprising:
  a carrier layer (10), and
  an adhesive layer (20),
wherein the thickness ($d_{10}$) of the carrier layer (10), the material of the carrier layer (10), and the composition of the adhesive layer (20) have been selected such that:
  a minimum deformation force ($F_{LIM}$) of the label is smaller than a first breaking force ($F_C$) needed to break the cardboard material (231) of the varnished cardboard (230),
  a minimum detaching force ($F_A$) of the label (100) is greater than the first breaking force ($F_C$), and
  the minimum detaching force ($F_A$) is smaller than a second breaking force ($F_{BRK}$) needed to break the label (100),
wherein the first breaking force ($F_C$) is a first pulling force which causes breaking of the cardboard material (231) in a situation where the label (100) is separated from the varnished cardboard (230) by pulling the label (100) with said first pulling force, and the minimum detaching force ($F_A$) is a second pulling force which is needed to separate the adhesive layer (20) of the label (100) from the surface (SRF4) of the varnished cardboard (230) in a situation where the label (100) is pulled with said second pulling force.

Example 8

The combination of example 7 wherein the opening joint (201) can be opened by breaking the label (100) without causing visually detectable damage to the package (200).

Example 9

The combination of example 7 wherein the opening joint (201) cannot be opened without causing visually detectable damage to the package (200).

Example 10

The combination according to any of the examples 7 to 9 wherein the package comprises a further opening portion, which is arranged to be opened by breaking the package.

Example 11

The combination according to any of the examples 7 to 10 wherein the package contains a substance selected from the group consisting of medicine, cosmetic product, and foodstuff.

Example 12

A web (WEB1), comprising:
  a carrier layer (10), and
  an adhesive layer (20), wherein the thickness ($d_{10}$) of the carrier layer (10), the material of the carrier layer (10), and the composition of the adhesive layer (20) have been selected such that:
  a minimum deformation stress value ($\sigma_{LIM}$) of the carrier layer (10) is smaller than a minimum breaking stress value ($\sigma_C$) of the carrier layer (10),
  a minimum detaching stress value ($\sigma_A$) of the carrier layer (10) is greater than the minimum breaking stress value ($\sigma_C$) of the carrier layer (10), and
  the minimum detaching stress value ($\sigma_A$) of the carrier layer (10) is smaller than the tensile strength ($\sigma_{BRK}$) of the carrier layer (10),
wherein the minimum deformation stress value ($\sigma_{LIM}$) is the stress of the carrier layer (10) in a situation where a label (100) cut from the web (WEB1) is pulled by a pulling force ($F_{LIM}$), which causes 30% final elongation of the carrier layer (10); the minimum breaking stress value ($\sigma_C$) is the stress of the carrier layer (10) in a situation where a label (100) cut from the web (WEB1) is separated from varnished cardboard by a pulling force ($F_C$), which causes breaking of the cardboard material; and the minimum detaching stress value ($\sigma_A$) is the stress of the carrier layer (10) in a situation where a label cut from the web (WEB1) is separated from the surface of a varnished cardboard by a pulling force ($F_A$).

Example 13

The web (WEB1) of example 12 comprising a plurality of visually detectable stretching indicators (90a, 90b).

Example 14

The web (WEB1) of example 12 or 13 wherein a first dimension ($L_{90a}$) of a stretching indicator (90a) is substantially equal to a second dimension ($w_{90a}$) of said stretching indicator (90a) so as to allow visual comparison of the first dimension ($L_{90a}$) with the second dimension ($w_{90a}$).

Example 15

The web (WEB1) according to any of the examples 12 to 14 wherein the elongation ($E_{BRK}$) at break of the carrier layer (10) is higher than or equal to 300%, advantageously higher than or equal to 450%, and preferably higher than or equal to 500%.

Example 16

The web (WEB1) according to any of the examples 12 to 15 wherein the carrier layer (10) comprises polypropylene.

For the person skilled in the art, it will be clear that modifications and variations of the devices and the methods according to the present invention are perceivable. The figures are schematic. The particular embodiments described above with reference to the accompanying drawings are illustrative only and not meant to limit the scope of the invention, which is defined by the appended claims.

What is claimed is:

1. A label suitable for use on a varnished cardboard, the label comprising:
  a carrier layer, and
  an adhesive layer,
  wherein the thickness of the carrier layer, the material of the carrier layer, and the composition of the adhesive layer have been selected such that:
    a minimum deformation force of the label is smaller than a first breaking force needed to break the cardboard material of the varnished cardboard,
    a minimum detaching force of the label is greater than the first breaking force, and
    the minimum detaching force is smaller than a second breaking force needed to break the label,
  wherein the first breaking force is a first pulling force which causes breaking of the cardboard material in a situation where the label is separated from the varnished cardboard by pulling the label with said first pulling force, and the minimum detaching force is a second pulling force which is needed to separate the label from the outer surface of the varnished cardboard in a situation where the label is pulled with said second pulling force.

2. The label of claim 1 comprising one or more visually detectable stretching indicators.

3. The label of claim 1 wherein a first dimension of a stretching indicator is substantially equal to a second dimension of said stretching indicator so as to allow visual comparison of the first dimension with the second dimension.

4. The label of claim 1 wherein the label has a substantially smooth and continuous carrier layer.

5. The label of claim 1 wherein the elongation at break of the carrier layer is higher than or equal to 450%.

6. The label of claim 1 wherein the carrier layer comprises polypropylene.

7. The label of claim 1, wherein the label does not comprise an incision or perforated part.

8. A combination of a label and a package, wherein the package comprises varnished cardboard, the label has been attached to the package such that an opening joint is located between two attachment regions of the label, the label comprising:
  a carrier layer, and
  an adhesive layer,
  wherein the thickness of the carrier layer, the material of the carrier layer, and the composition of the adhesive layer have been selected such that:
    a minimum deformation force of the label is smaller than a first breaking force needed to break the cardboard material of the varnished cardboard,
    a minimum detaching force of the label is greater than the first breaking force, and
    the minimum detaching force is smaller than a second breaking force needed to break the label,
  wherein the first breaking force is a first pulling force which causes breaking of the cardboard material in a situation where the label is separated from the varnished cardboard by pulling the label with said first pulling force, and the minimum detaching force is a second pulling force which is needed to separate the label from the outer surface of the varnished cardboard in a situation where the label is pulled with said second pulling force.

9. The combination of claim 8 wherein the opening joint can be opened by breaking the label without causing visually detectable damage to the package.

10. The combination of claim 8 wherein the opening joint cannot be opened without causing visually detectable damage to the package.

11. The combination of claim 8 wherein the package comprises a further opening portion, which is arranged to be opened by breaking the package.

12. The combination of claim 8 wherein the package contains a substance selected from the group consisting of medicine, cosmetic product, and foodstuff.

13. A web, comprising:
a carrier layer, and
an adhesive layer,
wherein the thickness of the carrier layer, the material of the carrier layer, and the composition of the adhesive layer have been selected such that:
- a minimum deformation stress value of the carrier layer is smaller than a minimum breaking stress value of the carrier layer,
- a minimum detaching stress value of the carrier layer is greater than the minimum breaking stress value of the carrier layer, and
- the minimum detaching stress value of the carrier layer is smaller than the tensile strength of the carrier layer, wherein the minimum deformation stress value is the stress of the carrier layer in a situation where a label cut from the web is pulled by a pulling force, which causes 30% final elongation of the carrier layer; the minimum breaking stress value is the stress of the carrier layer in a situation where a label cut from the web is separated from varnished cardboard by a pulling force, which causes breaking of the cardboard material; and the minimum detaching stress value is the stress of the carrier layer in a situation where a label cut from the web is separated from the surface of a varnished cardboard by a pulling force.

14. The web of claim 13 comprising a plurality of visually detectable stretching indicators.

15. The web of claim 13 wherein a first dimension of a stretching indicator is substantially equal to a second dimension of said stretching indicator so as to allow visual comparison of the first dimension with the second dimension.

16. The web of claim 13 wherein the elongation at break of the carrier layer is higher than or equal to 450%.

17. The web of claim 13 wherein the carrier layer comprises polypropylene.

* * * * *